(12) United States Patent
Chen et al.

(10) Patent No.: US 10,827,128 B2
(45) Date of Patent: Nov. 3, 2020

(54) CAMERA MODULE AND ELECTRONIC DEVICE USING SAME

(71) Applicant: TRIPLE WIN TECHNOLOGY(SHENZHEN) CO. LTD., Shenzhen (CN)

(72) Inventors: Shin-Wen Chen, New Taipei (TW); Long-Fei Zhang, Guangdong (CN); Ho-Kai Liang, New Taipei (TW); Po-Cheng Lee, New Taipei (TW); Kun Li, Guangdong (CN); Xiao-Mei Ma, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/387,165

(22) Filed: Apr. 17, 2019

(65) Prior Publication Data

US 2020/0228718 A1    Jul. 16, 2020

(30) Foreign Application Priority Data

Jan. 11, 2019   (CN) .......................... 2019 1 0028566

(51) Int. Cl.
*H04N 5/232* (2006.01)
*G03B 5/00* (2006.01)
*H04N 5/225* (2006.01)

(52) U.S. Cl.
CPC ........... *H04N 5/23296* (2013.01); *G03B 5/00* (2013.01); *H04N 5/2253* (2013.01);
(Continued)

(58) Field of Classification Search
CPC ............. H04N 5/23296; H04N 5/2254; H04N 5/2253; H04N 5/232125; G03B 5/00; G03B 2205/0061
See application file for complete search history.

(56) References Cited

U.S. PATENT DOCUMENTS 8,038,066 B2 * 10/2011 Havens ................... G02B 3/14
235/462.15
8,755,124 B2 * 6/2014 Aschwanden ........... G02B 3/14
359/665

(Continued)

FOREIGN PATENT DOCUMENTS

CN     207764455 U    8/2018
CN     207764528 U    8/2018

OTHER PUBLICATIONS

Definition of substrate, lexico.com, 2020, retrieved from https://www.lexico.com/en/definition/substrate on Jul. 3, 2020 (Year: 2020).*

*Primary Examiner* — Timothy J Henn
(74) *Attorney, Agent, or Firm* — ScienBiziP, P.C.

(57) ABSTRACT

A camera module of minimal size but with zoom function includes a zoom assembly, a base, and a fixed focus assembly. The zoom assembly and the fixed focus assembly are fixed in the base. The zoom assembly is driven by piezoelectric element instead of voice coil motor and includes an actuator and an optical unit. The actuator defines a first receiving groove holding the optical unit in place over the first through hole. When powered, the piezoelectric element changes a shape of the optical unit to change a focal length of the zoom assembly. An electronic device including such a camera module is also provided.

18 Claims, 6 Drawing Sheets

(52) U.S. Cl.
CPC ..... *H04N 5/2254* (2013.01); *H04N 5/232125* (2018.08); *G03B 2205/0061* (2013.01)

(56) References Cited

U.S. PATENT DOCUMENTS

| | | | | |
|---|---|---|---|---|
| 2005/0200973 A1* | 9/2005 | Kogo | .................. | G02B 3/14 |
| | | | | 359/689 |
| 2008/0259463 A1* | 10/2008 | Shepherd | ................. | G02B 3/14 |
| | | | | 359/666 |
| 2010/0231783 A1* | 9/2010 | Bueler | .................... | G02B 3/14 |
| | | | | 348/347 |
| 2010/0232161 A1* | 9/2010 | Aschwanden | ........... | G02B 3/14 |
| | | | | 362/278 |
| 2013/0114149 A1* | 5/2013 | Michael | ............. | G02B 26/0858 |
| | | | | 359/696 |
| 2013/0176628 A1* | 7/2013 | Batchko | .................. | G02B 3/12 |
| | | | | 359/665 |
| 2017/0017019 A1* | 1/2017 | Bolis | .................. | G02B 26/004 |
| 2017/0089547 A1* | 3/2017 | Ollila | .................... | G03B 15/05 |
| 2019/0018169 A1* | 1/2019 | Aschwanden | ....... | H04N 5/2254 |

\* cited by examiner

CAMERA MODULE AND ELECTRONIC DEVICE USING SAME

FIELD

The subject matter herein generally relates to a camera module and an electronic device using same.

BACKGROUND

As the pixel-count of camera modules increases, the depth of field of the camera modules becomes shorter, resulting in a smaller shooting range of the prime lenses.

The shooting range of the prime lenses can be increased by applying voice coil motors to achieve focussing at different distances, by moving the lenses in or out. However, as the pixel-count of the camera modules increases, a size of the voice coil motor also increases, which affects the design of electronic devices employing large voice coil motors. At the same time, the employment of the voice coil motors in electronic devices results in disadvantages such as slow focus speed, noises during focusing, increased vulnerability (easy breakage of voice coils etc), and high cost.

Thus, there is a need for a cameral module which addresses these problems.

BRIEF DESCRIPTION OF THE DRAWINGS

Implementations of the present technology will now be described, by way of embodiments, with reference to the attached figures.

DETAILED DESCRIPTION

Figure 1:
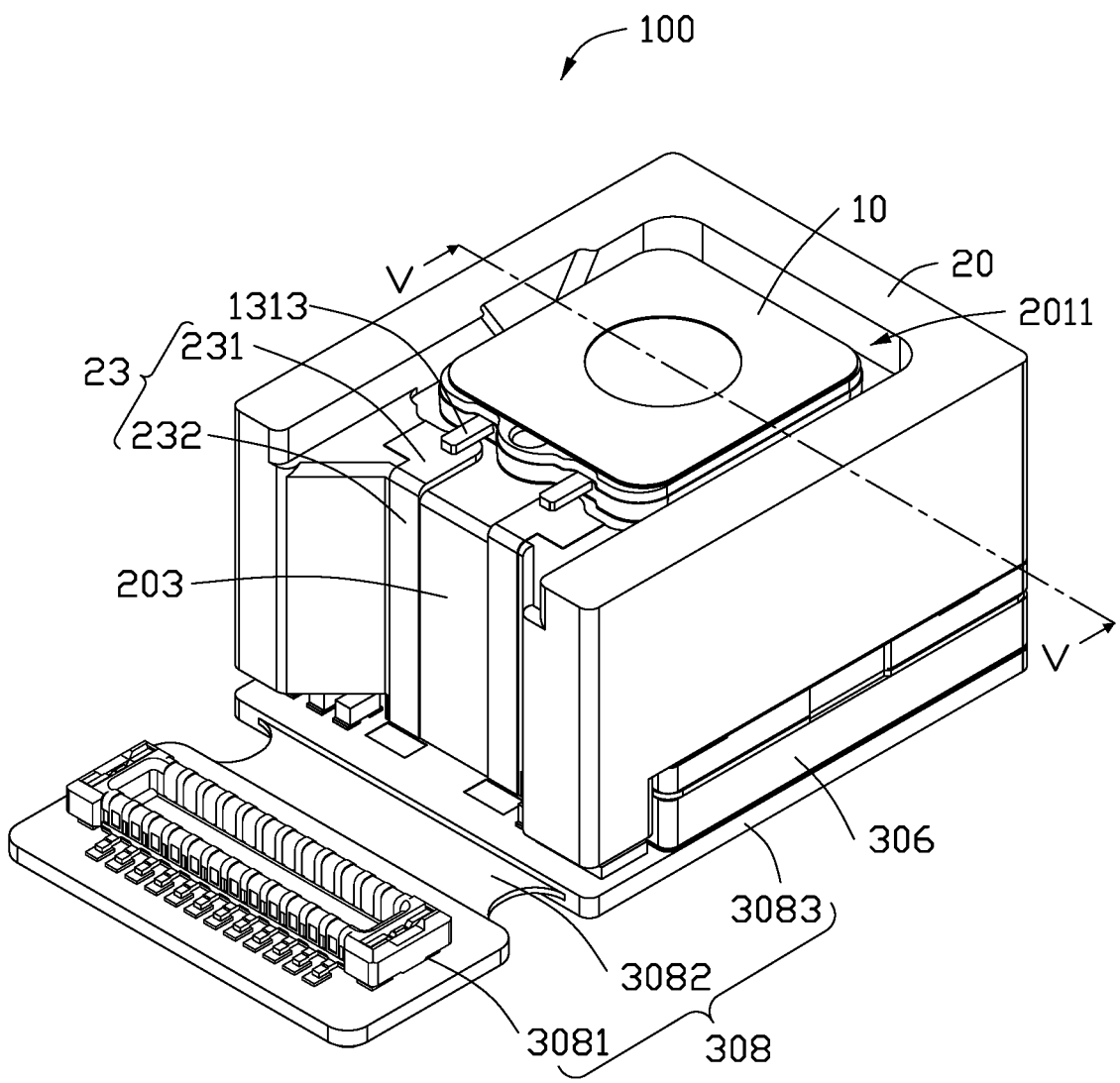
FIG. 1 is an isometric view of a camera module according to an embodiment of the present disclosure.
Figure 2:
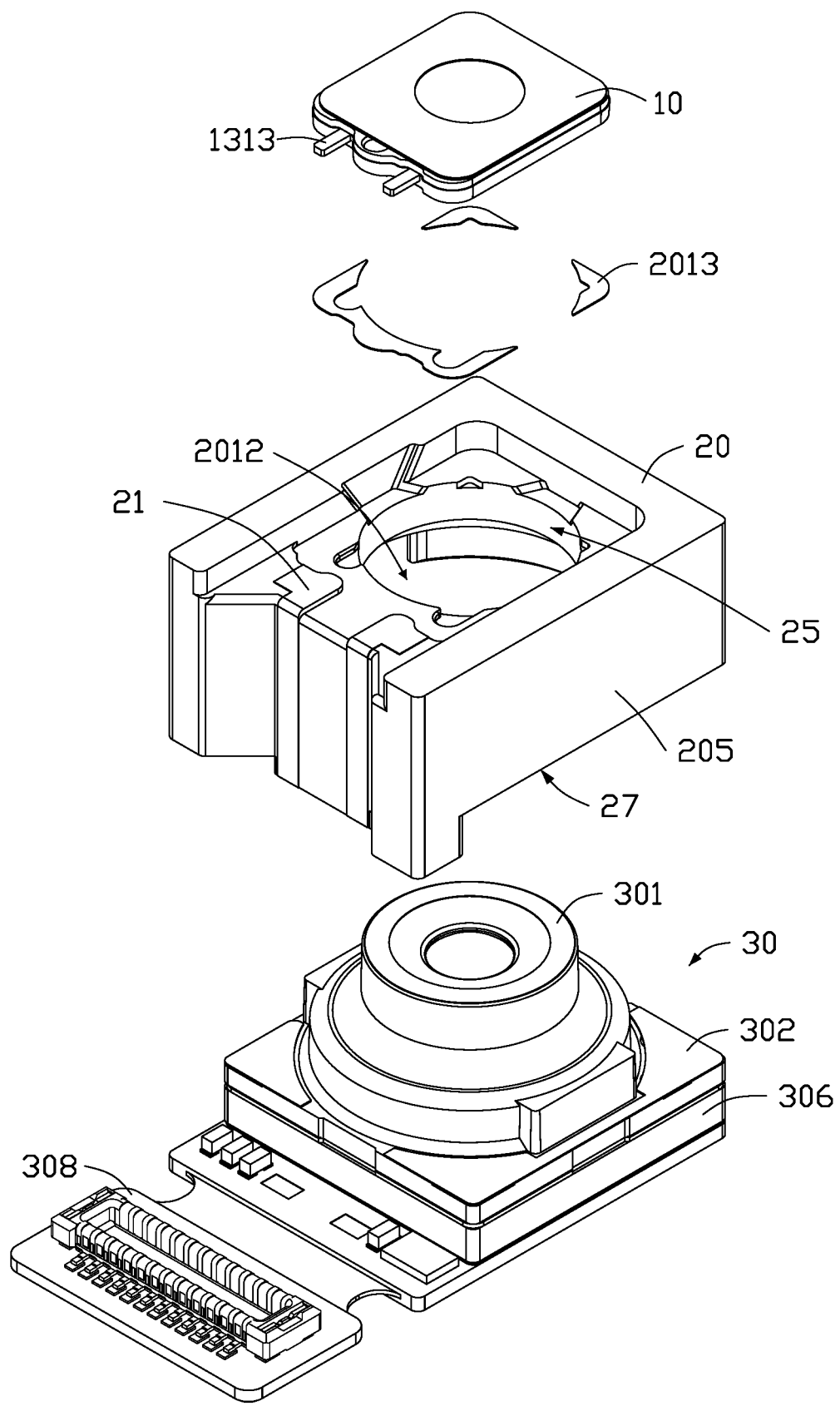
FIG. 2 is an exploded view of the camera module of FIG. 1.
Figure 3:
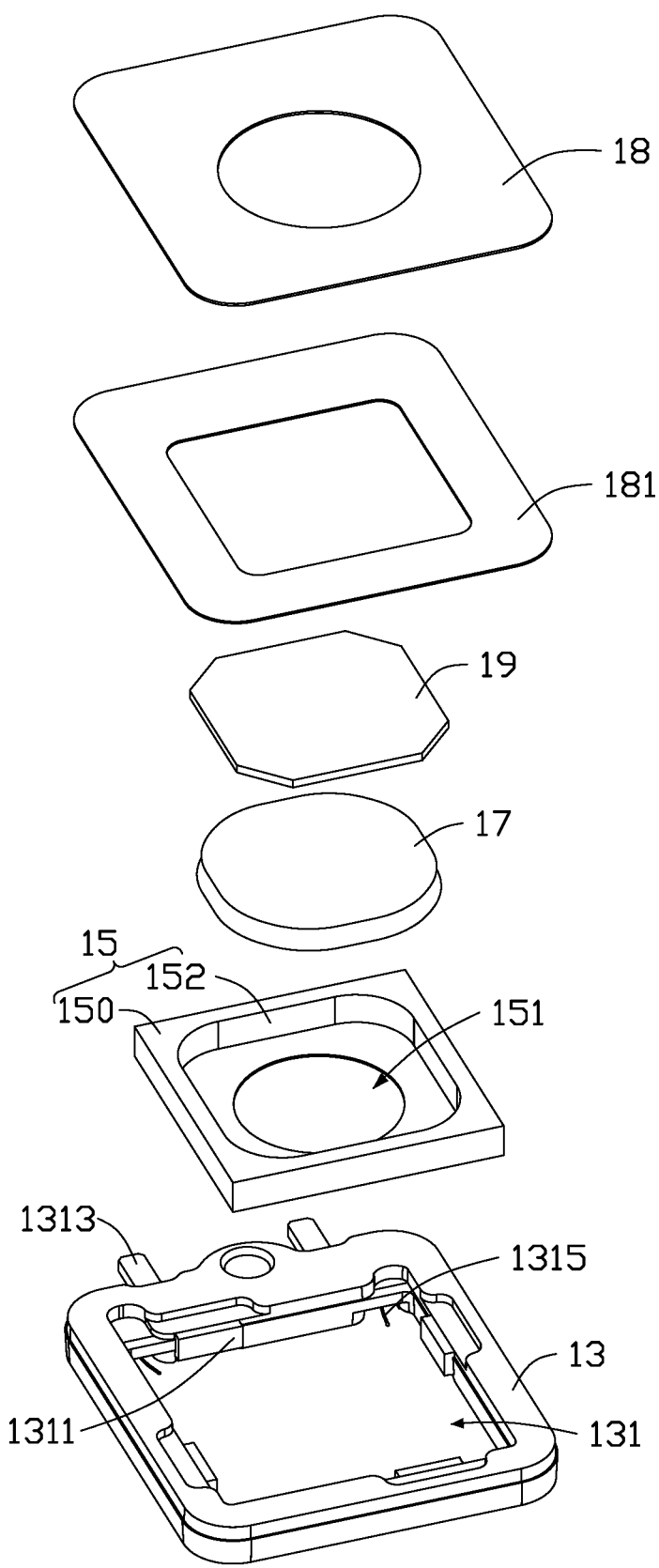
FIG. 3 is an exploded view of a zoom assembly of the camera module of FIG. 2.
Figure 4:
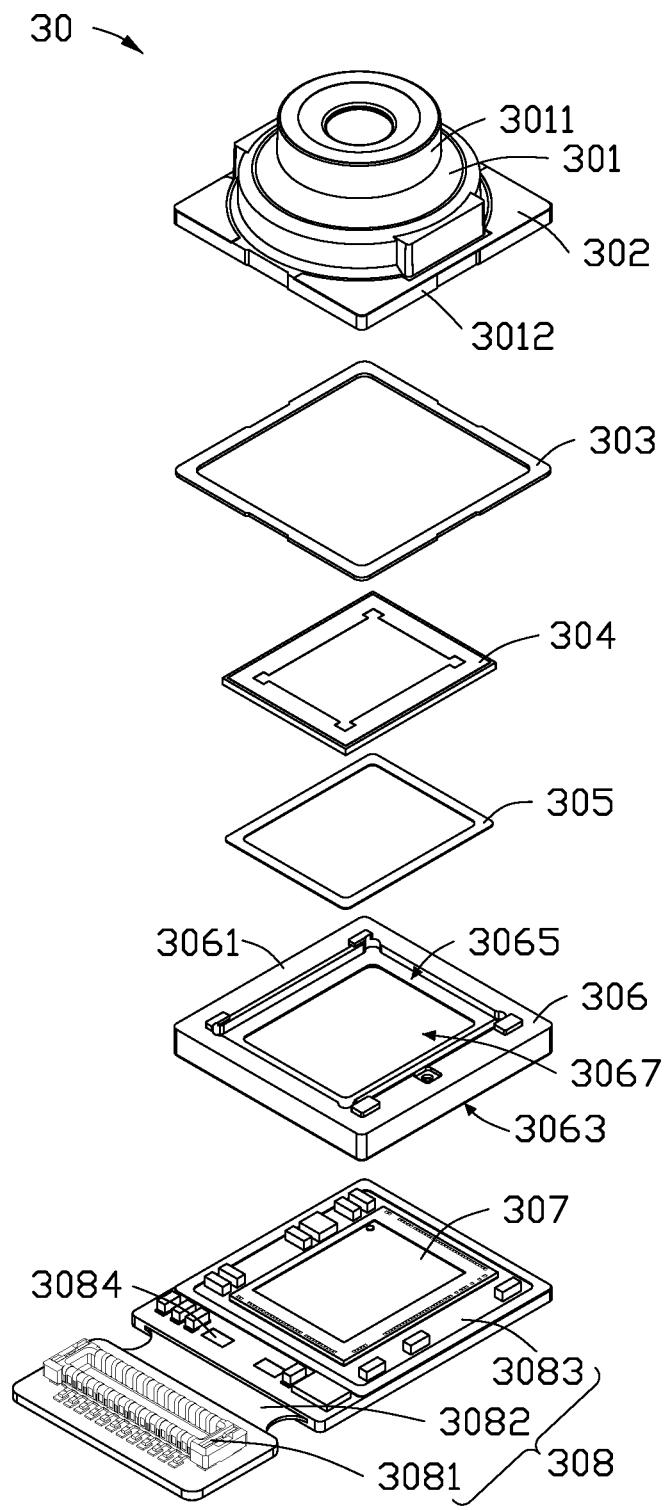
FIG. 4 is an exploded view of a fixed focus assembly of the camera module of FIG. 2.

The present disclosure is made in conjunction with the accompanying drawings. Specific embodiments of the present disclosure are described.

In the following description, when an element is described as being "fixed to" another element, the element can be fixed to the another element with or without intermediate elements. When an element is described as "connecting" or "connecting to" another element, the element can be connected to the other element with or without intermediate elements.

Without definition otherwise, all terms given below are of the same meaning as commonly understood by those skilled in the art. The term "and/or" means including any and all combinations of one or more of associated listed items.

Referring to FIGS. 1-4, a camera module includes a zoom assembly 10, a base 20, and a fixed focus assembly 30. The zoom assembly 10 and the fixed focus assembly 30 are fixed in the base 20. The zoom assembly 10 is on object side and opposite to the fixed focus assembly 30. The zoom assembly 10 includes an actuator 15 and an optical unit 17. The actuator 15 includes a substrate 150 and a piezoelectric driving member 152. The substrate 150 is substantially frame-shaped and defines a first receiving groove 151 for receiving the piezoelectric driving member 152. A first through hole 153 is defined at the center of the bottom of the first receiving groove 151. The optical unit 17 is received in the first receiving groove 151 and covers the first through hole 153. The piezoelectric driving member 152 contacts the optical unit 17, and is configured to change a shape of the optical unit 17 to change a focal length of the zoom assembly 10. In the embodiment, the optical unit 17 is a flexible lens formed by transparent liquid contained in flexible transparent cover. The flexible cover can be a polymethyl methacrylate film and the transparent liquid can be transparent high molecular polymer.

The piezoelectric driving member 152 moves when it receives electrical energy. In detail, the piezoelectric driving member 152 deforms when powered by electricity. The piezoelectric driving member 152 deforms the optical unit 17, thus changing the diopter of the optical unit 17 and adjusting a focal length of the optical unit 17. The piezoelectric driving member 152 is made of lead zirconate titanate. The lead zirconate titanate (Pb(ZrTi)O3 or PZT) has high sensitivity and is easily attached to other objects.

In the embodiment, the zoom assembly 10 further includes a receiving frame 13, a glass piece 19 and a protective cover 18. The actuator 15 is received in the receiving frame 13. The glass piece 19 is received in the first receiving groove 151 and covers the optical unit 17. The protective cover 18 is fixed to the receiving frame 13 at the object side.

The receiving frame 13 is substantially hollow and defines a second receiving groove 131. The second receiving groove 131 has substantially same size as that of the actuator 15 and is configured for receiving the actuator 15. The second receiving groove 131 has an inner wall 1311. At least one pin 1313 extends from an outside wall of the receiving frame 13 opposite to the inner wall 1311. At least one wire 1315 extends from the inner wall 1311. One end of the wire 1315 is electrically connected with the pin 1313, and another end of the wire 1315 is electrically connected with the actuator 15.

The protective cover 18 is fixed to the receiving frame 13 by a first adhesive layer 181. The protective cover 18 defines a second through hole 182 aligned with the first through hole 153. The second through hole 182 is for limiting size of image of a scene.

The base 20 is substantially a rectangular frame. The base 20 includes a top wall 201 towards the object side, a first side wall 203, and a plurality of second side walls 205. The first side wall 203 and the second side walls 205 are perpendicular to the top wall 201. The top wall 201 is recessed inwardly to form a first receiving cavity 2011 for receiving the zoom assembly 10. The top wall 201, the first side wall 203, and the second side walls 205 cooperatively form a second receiving cavity 2012 for receiving the fixed focus assembly 30.

The first receiving cavity 2011 has a size substantially the same as that of the zoom assembly 10. The zoom assembly 10 is fixed in the first receiving cavity 2011 by a second adhesive layer 2013. The top wall 201 defines a third through hole 25 which joins the first receiving cavity 2011 with the second receiving cavity 2012. The third through hole 25 has a central axis coinciding with a central axis of the zoom assembly 10. Light passes through the zoom assembly 10 and the third through hole 25 to enter the fixed focus assembly 30.

The base 20 includes at least one conductive element 23. The conductive element 23 has a first end 231 fixed on the bottom of the first receiving cavity 2011 and a second end 232 fixed on the first side wall 203. The first end 231 of the conductive element 23 contacts and electrically connects with the pin 1313. The fixed focus assembly 30 includes a circuit board 308. The circuit board 308 contacts and the electrically connects with the second end 232 of the conductive element 23.

The pin 1313 and the conductive element 23 can be electrically connected by solder paste and/or conductive paste. The conductive element 23 is formed by a laser direct structuring technique ("LDS") or by an injection molding process.

In the embodiment, the circuit board 308 includes a first area 3081, a second area 3082, and a third area 3083, all of which are joined. The third area 3083 is formed with at least one contact leg 3084 electrically connected with the second end 232 of the conductive element 23. In the embodiment, the contact leg 3084 and the second end 232 are electrically connected by conductive paste and/or solder paste. Each of the first area 3081 and the third area 3083 includes a rigid circuit board portion, and the second area 3082 includes a soft circuit board portion.

In the embodiment, the fixed focus assembly 30 includes a lens module 301, a filter 304, a bracket 306, and an image sensor 307. The bracket 306 is fixed on the circuit board 308, facing the object side. The image sensor 307 is received in the bracket 306, facing the object side. The filter 304 is fixed on the bracket 306 and is aligned with the image sensor 307. The lens module 301 is fixed to the bracket 306 facing the object side. The base 20 is sleeved on the lens module 301. The first side wall 203 is longer than the second side walls 205 so that a bump 207 is formed at an end of the first side wall 203 and opposite to the top wall 201. The bump 207 is in contact with the third area 3083. The image sensor 307 is disposed in the third area 3083.

Figure 5:
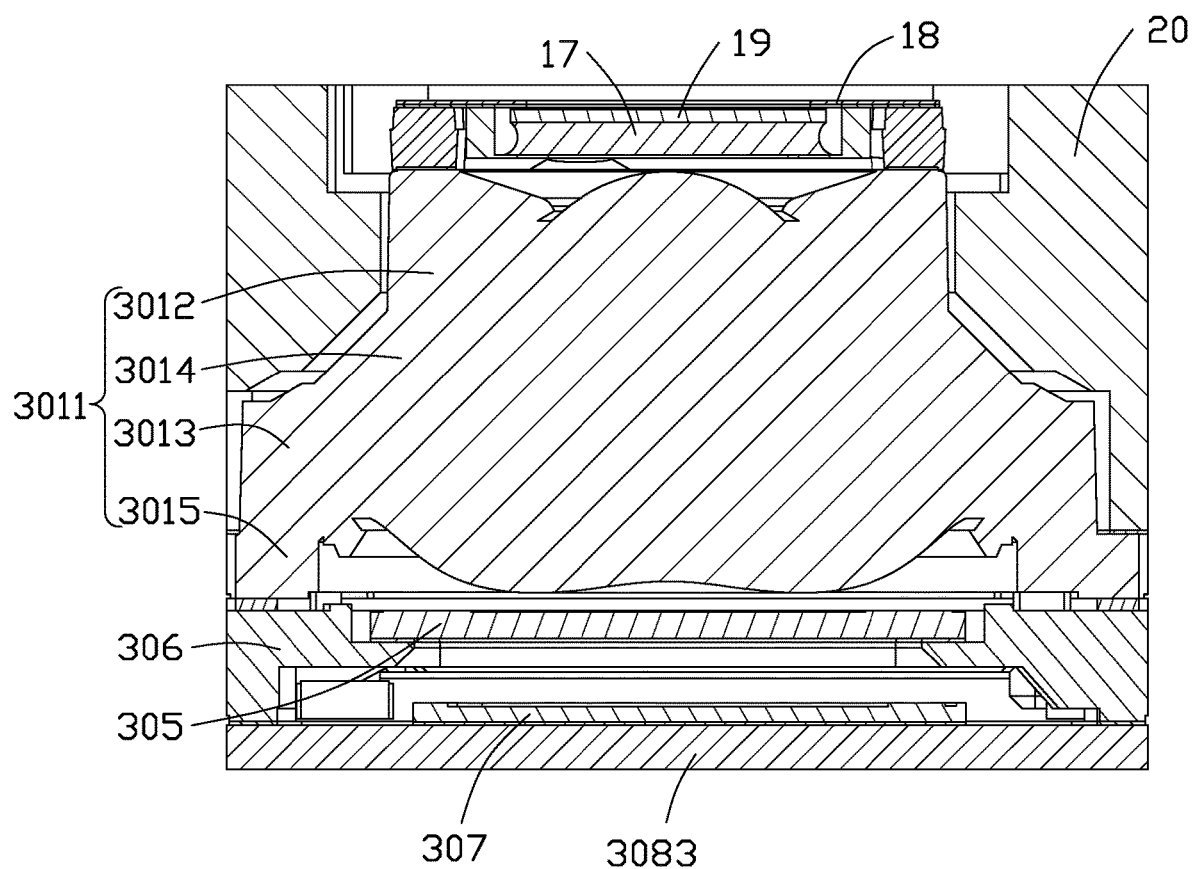
FIG. 5 is a cross-sectional view along line V-V of FIG. 1.

Referring to FIG. 5, the lens module 301 includes a lens barrel 3011 and at least one lens (not shown) received in the lens barrel 3011. The lens and the lens barrel 3011 are integrally formed. The lens barrel 3011 includes a first barrel portion 3012, a second barrel portion 3014, and a third barrel portion 3015. The second barrel portion 3014 is connected between the first barrel portion 3012 and the third barrel portion 3015. The first barrel portion 3012, the second barrel portion 3014, and the third barrel portion 3015 are arranged in an order from object side to image side. The first barrel portion 3012, the second barrel portion 3014, and the third barrel portion 3015 abut inner surfaces of the first side wall 203 and the second side walls 205, thus stably holding the lens module 301 in the second receiving cavity 2012.

The third barrel portion 3015 extends outwardly along a direction perpendicular to the optical axis of the lens module 301 to form a fixing portion 3017. A third adhesive layer 302 is formed on the fixing portion 3017. An end of the second side wall 205 opposite to the top wall 201 is fixed to the fixing portion 3017 by the third adhesive layer 302.

The fixing portion 3017 is fixed on the bracket 306. The bracket 306 is substantially a rectangular frame including a first surface 3061 and a second surface 3063 opposite to the first surface 3061. The first surface 3061 recessed towards the second surface 3063 to form a third receiving groove 3065. A fourth through hole 3067 is defined at the bottom of the third receiving groove 3065. The fourth through hole 3067 runs through the second surface 3063 to allow entry of light. The filter 304 is fixed in the third receiving groove 3065 by a fourth adhesive layer 305.

Figure 6:
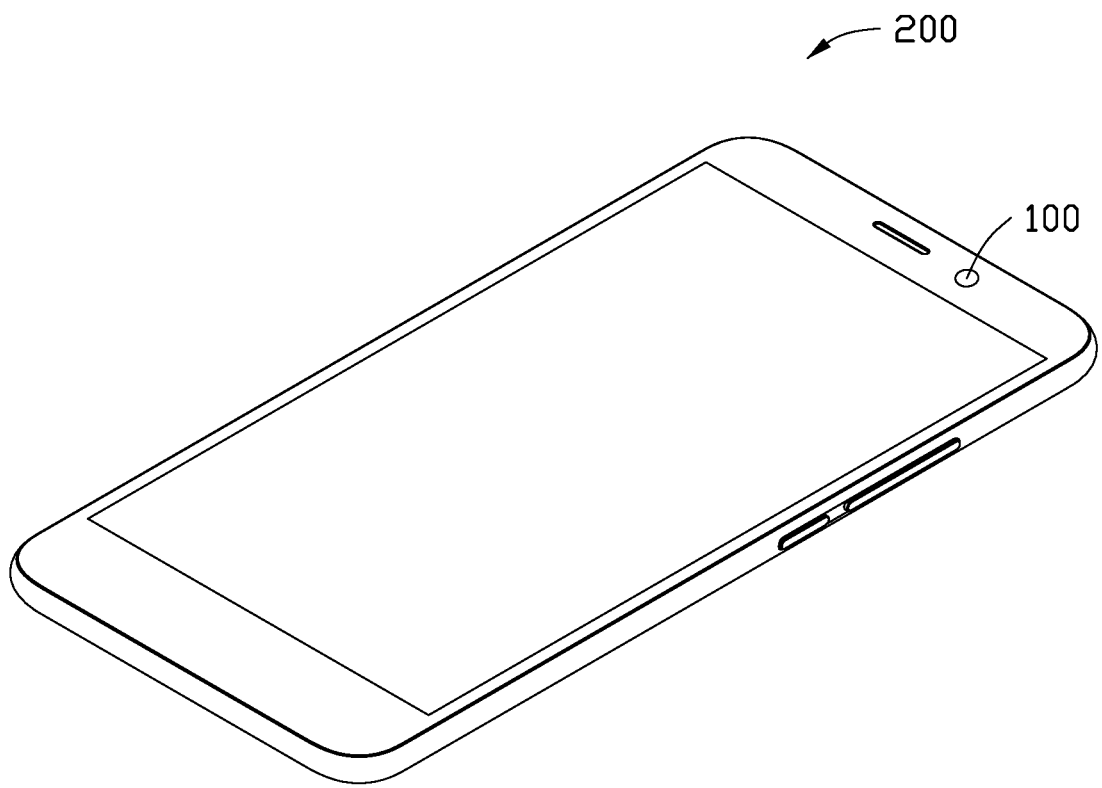
FIG. 6 is an isometric view of an electronic device employing the camera module of FIG. 1 according to an embodiment of the present disclosure.

Referring to FIG. 6, an electronic device 200 with the camera module 100 is provided. The electronic device 200 may be a mobile phone, a notebook computer, a desktop computer, or a game machine.

The camera module of embodiments employs a piezoelectric driving member to change shape of an optical body, thus changing focal length of a zoom assembly. Voice coil motor is thus not required. The piezoelectric driving member operates without audible noise. What is more, the structure of the zoom assembly is simplified, which reduces the overall size of the camera module and facilitates the disassembly and maintenance of the zoom assembly.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. A camera module comprising a zoom assembly, a base and a fixed focus assembly, the zoom assembly and the fixed focus assembly being fixed in the base, the zoom assembly comprising an actuator and an optical unit, the actuator comprising a piezoelectric driving member and a substrate defining a first receiving groove, a bottom of the first receiving groove defining a first through hole, the optical unit being received in the first receiving groove and covering the first through hole, the piezoelectric driving member being received in the first receiving groove and configured to change a shape of the optical unit to change a focal length of the zoom assembly.

2. The camera module as claimed in claim 1, wherein the piezoelectric driving member deforms when powered by electricity, the piezoelectric driving member presses against the optical unit to deform the optical unit when the piezoelectric driving member deforms, thus to change a diopter of the optical unit and change the focal length of the zoom assembly.

3. The camera module as claimed in claim 2, wherein optical unit is a flexible lens formed by transparent liquid covered by flexible transparent material.

4. The camera module as claimed in claim 3, wherein the transparent liquid is transparent high molecular polymer and the flexible material is a polymethyl methacrylate film.

5. The camera module as claimed in claim 2, wherein the piezoelectric driving member is made of lead zirconate titanate.

6. The camera module as claimed in claim 1, wherein the zoom assembly further comprises a receiving frame, a glass piece and a protective cover, the receiving frame defines a second receiving groove for receiving the actuator, the glass piece is received in the first receiving groove and covers the optical unit, the protective cover is fixed to the receiving frame at object side.

7. The camera module as claimed in claim 6, wherein the base comprises at least one conductive element, and the zoom assembly comprises at least one pin electrically connected with the actuator, the fixed focus assembly comprises a circuit board, and the zoom assembly is electrically connected with the circuit board by the conductive element.

8. The camera module as claimed in claim 7, wherein the base comprises a top wall towards the object side, and a first side wall and a plurality of second side walls perpendicular to the top wall, the top wall is recessed to form a first receiving cavity for receiving the zoom assembly, the top wall, the first side wall, and the second side walls cooperatively form a second receiving cavity for receiving the fixed focus assembly.

9. The camera module as claimed in claim 8, wherein the conductive element has a first end fixed on bottom of the first receiving cavity and a second end fixed on the first side wall, the first end contacts and electrically connects with the pin, and the second end contacts and electrically connects with the circuit board.

10. The camera module as claimed in claim 9, wherein the fixed focus assembly comprises a lens module, a filter, a bracket and an image sensor, the bracket is fixed on the circuit board and faces the object side, the image sensor is received in the bracket, the filter is fixed on the bracket and aligned with the image sensor, the lens module is fixed to the bracket facing the object side, the base is sleeved on the lens module.

11. The camera module as claimed in claim 10, wherein the lens module comprises a lens barrel and at least one lens received in the lens barrel, the lens barrel comprises a first barrel portion, a second barrel portion and a third barrel portion which are arranged in an order from the object side to an image side, the first barrel portion, the second barrel portion and the third barrel portion abut inner surfaces of the first side wall and the second side walls to hold the lens module in the second receiving cavity.

12. The camera module as claimed in claim 11, wherein the lens and the lens barrel are integrally formed.

13. The camera module as claimed in claim 11, wherein the third barrel portion extends outwardly along a direction perpendicular to an optical axis of the lens module to form a fixing portion, the fixing portion is fixed to the bracket.

14. The camera module as claimed in claim 13, wherein an end of the second side wall opposite to the top wall is fixed to the fixing portion.

15. The camera module as claimed in claim 9, wherein a bump is formed at an end of the first side wall opposite to the top wall, the bump is in contact with the circuit board.

16. An electronic device comprising a camera module, wherein the camera module comprises a zoom assembly, a base and a fixed focus assembly, the zoom assembly and the fixed focus assembly are fixed in the base, the zoom assembly comprises an actuator and an optical unit, the actuator comprises a piezoelectric driving member and a substrate defining a first receiving groove, a bottom of the first receiving groove defines a first through hole, the optical unit is received in the first receiving groove and covers the first through hole, the piezoelectric driving member is received in the first receiving groove and configured to change a shape of the optical unit to change a focal length of the zoom assembly.

17. The electronic device as claimed in claim 16, wherein the piezoelectric driving member deforms when powered by electricity, the piezoelectric driving member presses against the optical unit to deform the optical unit when the piezoelectric driving member deforms, thus to change a diopter of the optical unit and change the focal length of the zoom assembly.

18. The electronic device as claimed in claim 17, wherein the piezoelectric driving member is made of lead zirconate titanate.

* * * * *